United States Patent [19]

Niitsu

[11] 4,412,218

[45] Oct. 25, 1983

[54] REMOTE CONTROL SIGNAL TRANSMITTER CAPABLE OF SETTING CUSTOM CODES INDIVIDUALLY ALLOTED TO A PLURALITY OF CONTROLLED INSTRUMENTS

[75] Inventor: Shigeo Niitsu, Tokyo, Japan

[73] Assignee: Nippon Electric Co., Ltd., Tokyo, Japan

[21] Appl. No.: 234,507

[22] Filed: Feb. 17, 1981

[30] Foreign Application Priority Data

Feb. 26, 1980 [JP] Japan .................................. 55-23166

[51] Int. Cl.[3] .................................................. H04Q 9/00

[52] U.S. Cl. ............................ 340/825.56; 340/365 S; 340/825.83

[58] Field of Search ............ 340/168 B, 168 S, 365 S, 340/825.52, 825.56, 825.72, 825.83, 825.44, 825.76

[56] References Cited

U.S. PATENT DOCUMENTS

| | | | |
|---|---|---|---|
| 3,789,364 | 1/1974 | Moses | 340/825.83 |
| 4,037,201 | 7/1977 | Willmott | 340/168 B |
| 4,208,630 | 6/1980 | Martinez | 340/825.44 |
| 4,231,019 | 10/1980 | Junginger et al. | 340/825.76 |
| 4,264,896 | 4/1981 | Sakarya et al. | 340/168 B |

*Primary Examiner*—Donald J. Yusko

*Attorney, Agent, or Firm*—Laff, Whitesel, Conte & Saret

[57] ABSTRACT

A remote control signal transmitter generates a scan signal. A plurality of scan signal output terminals convey the scan signals to a key matrix circuit having a plurality of column lines and a plurality of row lines connected to the respective scan signal output terminals. Key input terminals are connected to the respective column lines. A custom code selection terminal is selectively connected to the scan signal output terminals in accordance with a custom code corresponding to an instrument to be controlled. The transmitter makes use of scan signals to provide the custom code of the instrument to be controlled. Therefore, only the instrument having this custom code can be activated by the transmitter, and the operating condition of the activated instrument is controlled by the subsequently transmitted key data.

5 Claims, 2 Drawing Figures

REMOTE CONTROL SIGNAL TRANSMITTER CAPABLE OF SETTING CUSTOM CODES INDIVIDUALLY ALLOTED TO A PLURALITY OF CONTROLLED INSTRUMENTS

BACKGROUND OF THE INVENTION

The present invention relates to a transmitter for generating a control signal for remotely controlling the operations of various instruments such as television receivers, audio sets, video tape recorders, toys, air conditioners, etc.

A remote control signal transmitter is a transmitter for controlling or changing the operation of an instrument which is to be controlled from a position that is remote from the place of the instrument. The control or change is effected by operating a desired key or switch in a keyboard section on the transmitter. The data for control or the data for change may be transmitted by infrared rays, electromagnetic waves or supersonic waves. At present, infrared rays are mainly used as transmission means.

The transmitted data are received by a receiver section of the instrument to be controlled, and are converted into an electric signal, as a control signal. For instance, data transmitted as an optical signal, by means of infrared rays, are converted into an electric signal by a photo-sensitive element in the receiver section. The information of the converted electric signal is decoded by a control circuit in the receiver section, and then, the operation of the instrument is controlled in response to the decoded data.

In such a remote control system, the semiconductor integrated circuit (hereinafter, referred to as "IC") has been also widely utilized. More particularly, in order to make a transmitter compact and light in weight, an IC for remote control is contained in the transmitter. The coding to an operated key or switch in the keyboard section, as well as a transmission of the key code data, are carried out by this IC.

In this case, when remote control signal transmitters are constructed for different instruments by using IC's having the same circuit construction, the following shortcoming may occur. For instance, assume that in one room there are three different instruments: a television receiver, a video tape recorder and an air conditioner. Suppose further that each instrument has its own remote control signal transmitter employing an IC. Let us consider the case where, in order to change a receiving channel of the television receiver, the corresponding key switch is pressed on the remote control signal transmitter for the television receiver. Then the IC contained in the remote control signal transmitter for the television receiver detects the pushed key switch and produces key code data corresponding to that key switch. The key code data is appropriately modulated and transmitted from the transmitter to the television receiver, in the form of, for example, infrared rays. The transmitted infrared rays are received by a control signal receiving section of the television receiver. The receiving section converts the received infrared rays into an electric signal corresponding to the key code data, to change the channel of the television receiver. At this moment, the transmitted infrared rays may be possibly received by the control signal receiving section of the video tape recorder and/or the control signal receiver of the air conditioner. If this should occur, the control signal receiving section of the video tape recorder and/or the air conditioner would also respond to the transmitted key code data. As a result, the operating of the video tape recorder and/or the air conditioner would be erroneously changed in response to the key code data for controlling the television receiver.

In order to obviate this disadvantage, a custom code which is inherent in the respective instruments is individually preset for enabling the individual pairs of the control signal transmitter and the control signal receiving section for a plurality of instruments to communicate with each other, so that one control signal transmitter having assigned one custom code may not control instruments having different assigned custom codes. More particularly, remote control IC in the transmitter, first outputs its preset code data for the instrument paired with that transmitter. Then, the remote control IC outputs key data code by use of the key switch for controlling the change of operation. The respective instruments have inherent custom code data preset individually therefor.

Accordingly, even if a plurality of instruments receive the control signal, only the instrument having custom code data coincident with the transmitted custom code data preset can be activated. The activated instrument can receive the subsequently transmitted key code data, and its operation is controlled according to information of the key code data. Whereas, an instrument whose custom code is not coincident with the transmitted custom code has its receiving section held inactive. Accordingly, it does not respond to the subsequently transmitted key code data, and an undesired change of operation can be avoided.

However, if a plurality of remote control signal transmitters, for a plurality of different instruments, are constructed by making use of IC's having the same circuit construction, there is a shortcoming. As the number of controlled instruments is increased, the number of external terminals increases on the IC used for presetting the custom codes. This is because the custom code is set by the external switches. More particularly, the custom code can be arbitrarily preset by means of a combination of logic signals of "1" or "0" (logic signal "1" represents a high level, while logic signal "0" represents a low level). However, the combination of signals must be provided to the IC in the process of manufacturing the instruments. For this purpose, external terminals on the IC serving as custom code selection terminal are unavoidable. If only one terminal is prepared for this external terminal, then only two kinds of the signal combination of "0" or "1" are available. This means that custom codes for two instruments only can be preset with a result that only two transmitters can be controlled.

Therefore, to produce transmitters for a large number of instruments by making use of the IC's of the same circuit construction, the number of external terminals on the IC would increase in accordance with the number of the instruments to be controlled. For instance, in order to produce 10 pairs of transmitter and instrument, 10 kinds of signal combinations are necessary, so that at least 4 external terminals are required. Consequently, as the number of pairs of transmitter and instrument is increased, the chip size and cost of the IC for remote control is increased due to the increase of the external terminals. As a result, the size and weight of the control signal transmitter also become large.

SUMMARY OF THE INVENTION

Therefore, a major object of the present invention is to provide a remote control signal transmitter having an IC for remote control which may set a plurality of custom codes with a minimal number of external terminals.

According to one feature of the present invention, a remote control signal transmitter comprises a generating means for generating scan signals, a plurality of scan signal output terminals through which the scan signals are output, a key matrix circuit having a plurality of column lines and a plurality of row lines connected to the respective scan signal output terminals. Key input terminals are connected to the respective column lines, a custom code selection terminal, custom code designation means for selectively connecting the scan signal output terminals to the custom code selection terminal in accordance with a custom code corresponding to an instrument to be controlled. Output means output a custom code derived from the custom code selection terminal and key data derived from the key matrix circuit.

The transmitter, according to the present invention, can provide the custom code of the instrument to be controlled with only one custom code selection terminal, by making use of scan signals. More particularly, from the scan signal output terminals are output the scan signals to be used for detecting which key switch in the key matrix circuit has been pushed. At this moment, the scan signals are not output simultaneously from the plurality of the scan signal output terminals, but they are output sequentially.

Accordingly, when the custom code selection terminal is connected to the scan signal output terminals via custom code designation means, the scan signal output from the scan signal output terminals is also applied to the custom code selection terminal. However, if a scan signal has been output from a certain scan signal output terminal which is not connected to the custom code selection terminal, the signal from the particular scan signal output terminal is not applied to the custom code selection terminal. Thus, depending upon the existance or non-existance of the custom code designation means, a preset custom code can be obtained corresponding to an instrument to be controlled which consists of a time sequential combination of logic signals "1" and "0". This custom code is output jointly with key data fed from the key matrix circuit. Therefore, only the instrument having this custom code alloted thereto can be activated by the transmitter. The operating condition of the activated instrument is controlled by the subsequently transmitted key data.

As described above, according to the present invention, a custom code is preset by making use of scan signals which are output from scan signal output terminals responsive to a key condition. Accordingly, by changing the number and/or connecting positions of the custom code designation means, connecting the scan signal output terminals to the custom code selection terminal, a plurality of custom codes can be established. In other words, if n scan signal output terminals are provided, $2^n$ kinds of signal combinations can be derived at the custom code selection terminal. This means that since $2^n$ kinds of custom codes can be preset, transmitters for $2^n$ different instruments can be produced with IC's having the same circuit for remote control.

BRIEF DESCRIPTION OF THE DRAWINGS

Other objects, features and advantages will become more apparent by reference to the following description of a preferred embodiment of the invention taken in conjuction with the accompanying drawings, wherein.

DETAILED DESCRIPTION OF A PREFERRED EMBODIMENT

Figure 1:
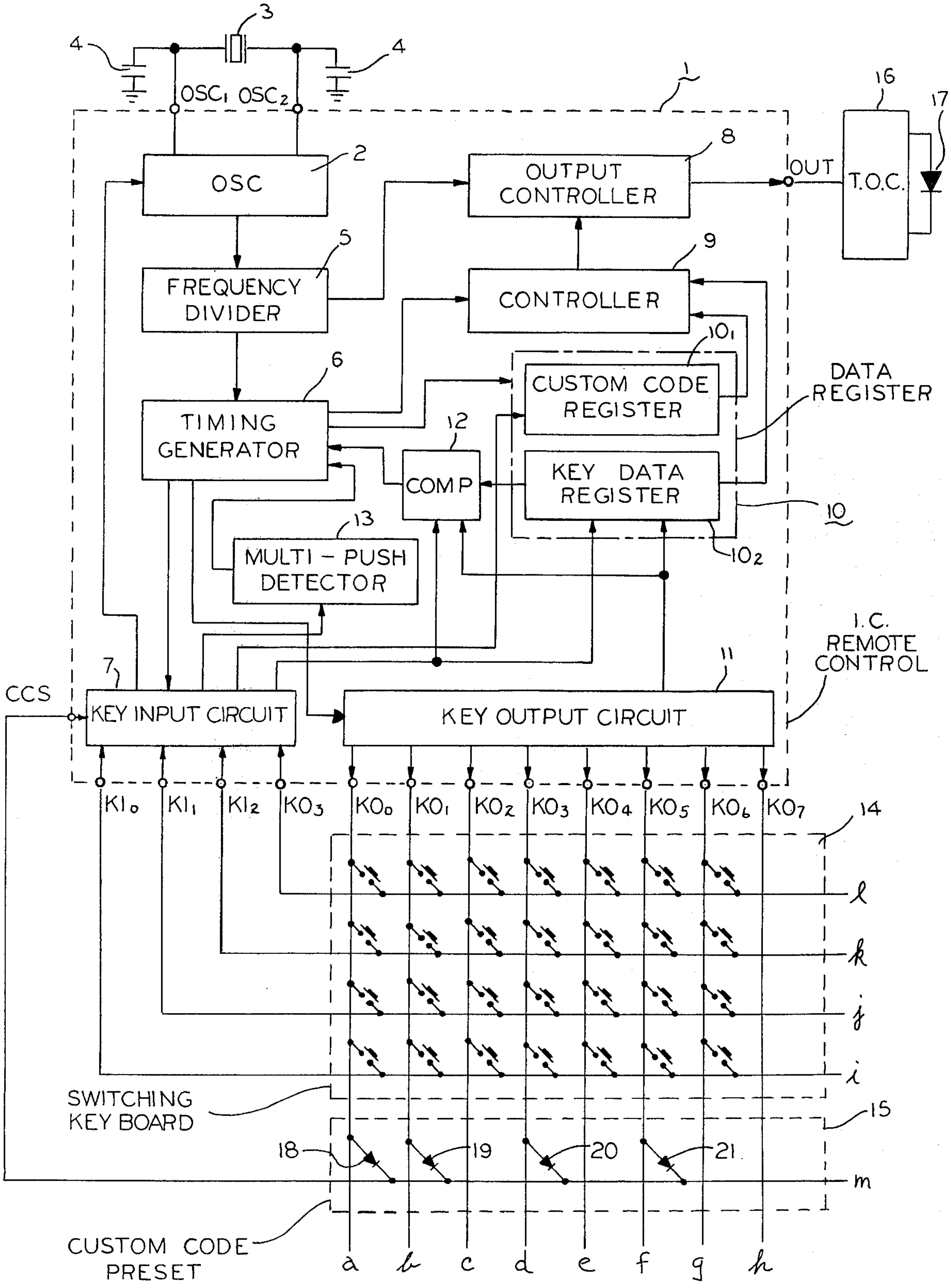
FIG. 1 is a block diagram showing an infrared ray remote control signal transmitter according to one preferred embodiment of the present invention.

Referring now to FIG. 1 of the drawings, a remote control signal transmitter (hereinafter referred to as transmitter), according to one preferred embodiment of the present invention, includes an IC for remote control which is represented by a block 1 encircled by a dotted line frame. In this IC 1, a reference oscillation signal of 455 KHz is produced by an oscillator 2. A ceramic resonator 3 and two capacitors 4 are connected to oscillation terminals $OSC_1$ and $OSC_2$. This oscillation signal is frequency-divided by 256 by means of frequency divider 5 consisting of 8 stages of flip-flops. As a result of this frequency-division, a signal having a period of 0.563 ms is used as a basic clock signal. This clock signal is applied to a timing generator 6 which generates a timing signal for controlling the operation timing of the entire system.

A signal of 38 KHz is derived from an intermediate stage of flip-flop of the frequency-divider 5 and is fed to an output controller 8 as a carrier signal for an infrared ray signal. A timing signal is generated by the timing generator 6 and is fed to a key input circuit 7 which receives signals representing a state of a keyboard switch section 14, for setting a key data designating operation which is to be controlled and a state of a custom code preset section 15 for presetting a custom code data corresponding to the instrument to be controlled.

A timing signal is also applied to a key output circuit 11 for generating scan signals to be applied to the keyboard switch section 14 and to a data register 10 for storing key data and custom code data. Still further, a timing signal is applied to a controller 9 for controllably feeding the data of the data register 10 to the output controller 8. The data register 10 includes a custom code register $10_1$ for storing custom code data and a key data register $10_2$ for storing key data. The data stored in the key data register $10_2$ are compared by a comparator 12 with key data obtained in response to additional scans by the scan signals, for the purpose of preventing malfanctions caused by a key noise and the like. If the respective data are not coincident to each other, the comparator 12 applies a signal to the timing generator 6 for commanding a repeated data read operation. If two or more switches have been depressed at the same time, this state is detected by a multi-push detector 13. The multi-push detector 13 detects such states, and similarly to the comparator 12, applies a signal to the timing generator 6 for commanding a repeated data read operation.

An output of the output controller 8, is an output of the IC 1 for remote control. This output is supplied to a transmission output circuit 16 by way of an output terminal OUT. In response to that output, the transmission output circuit 16 drives an infrared ray emitting diode 17, and hence an infrared ray output signal is fed to the instrument to be controlled. In order to reduce power consumption of the circuit while it is in an unoperated condition, the oscillator 2 is held in an oscillation hold state to deactivate the transmitter. In order to make the transmitter restart, the oscillator 2 resumes its oscillation responsive to the signal from the key input circuit 7, informing the remote control circuit, the moment when any one of the key switches is pushed.

The key output circuit 11 outputs to eight first signal lines a to h (row lines) via key output terminals $KO_0$ to $KO_7$. To the key input circuit 7 are input four second signal lines i to l (column lines) via key input terminals $KI_0$ to $KI_3$. The keyboard switch section 14 is constructed so that these first signal lines a to h and second signal lines i to l may be selectively interconnected to each other through a pushed key switches. A custom code preset section 15 is constructed so that predetermined ones of the first signal lines a to h may be connected via diodes 18 to 21 to a third signal line m which is connected to a custom code selection terminal CCS. In the illustrated example, each of these diodes 18 to 21 connects the first signal lines a, b, d and f to the third signal line m, respectively. The information fed through the custom code selection terminal CCS is registered in the custom code register $\mathbf{10}_1$ by way of the key input circuit 7.

Figure 2:
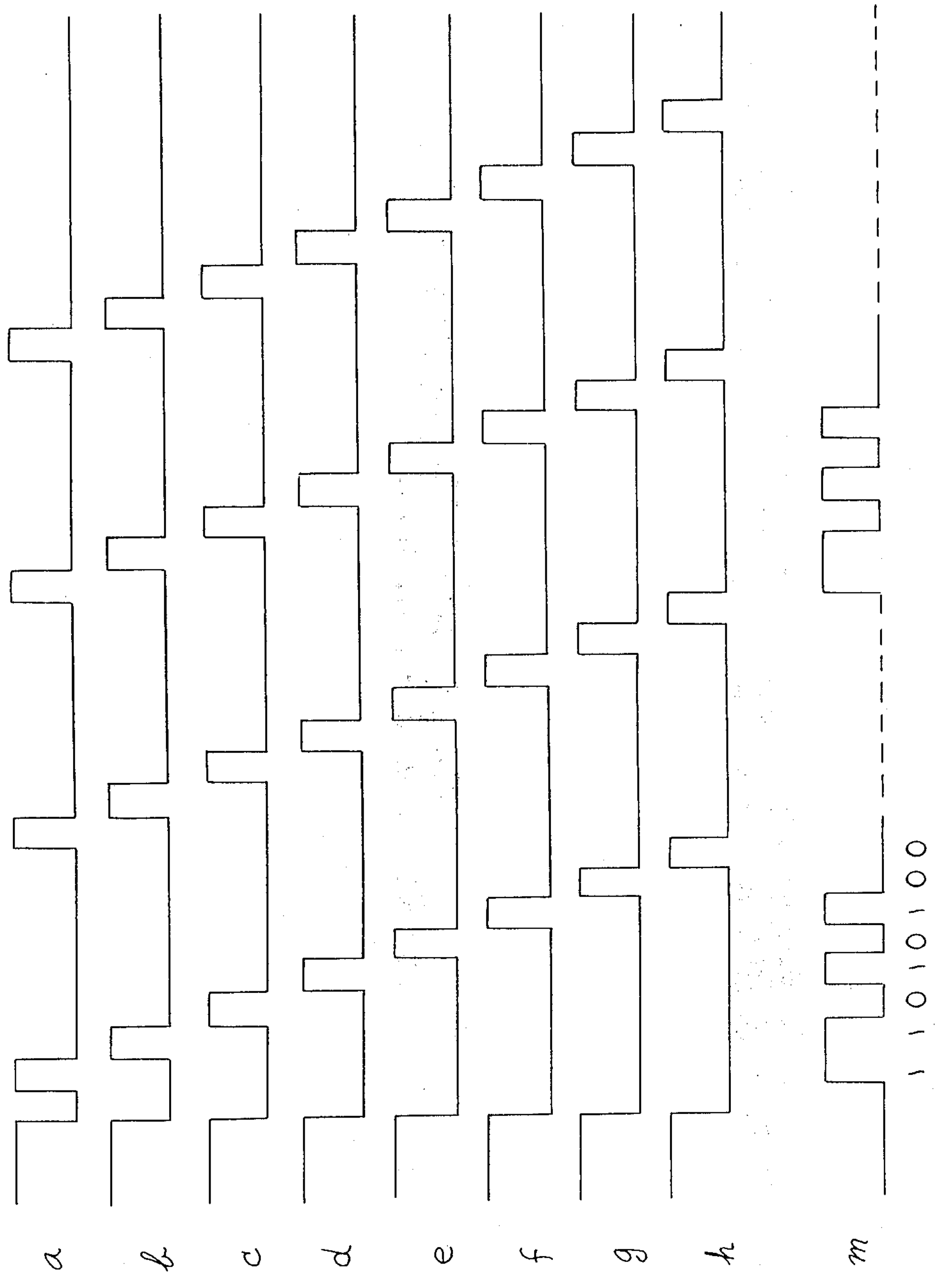
FIG. 2 is a timing chart of signals appearing on the respective signal lines shown in FIG. 1.

The operations of the above remote control signal transmitter will be described with reference to a timing chart shown in FIG. 2. At first, when none of the key switches in the keyboard switch section 14 is pushed, the oscillator circuit 2 is not operating, so that the IC is deactivated. Power consumption upon a stand-by period is thus suppressed. At this moment, the key output circuit 11 holds all the first signal lines a to h at a high level as shown in FIG. 2. On the other hand, all the key input terminals $KI_0$ to $KI_3$ take a low level.

Subsequently, in the keyboard switch section 14, when a key switch is pushed to connect the first signal line a to the second signal line l, for example, for changing the currently receiving channel of a television receiver, the data code at the second signal lines i to l input to the key input circuit 7 becomes 37 0001". In other words, when any one of the key switches is pushed, any one of the key input terminals $KI_0$ to $KI_3$ takes a high level. The key input circuit 7 detects such change from the initial states of these second signal lines i to l. Then, the key input circuit 7 supplies the drive signal to the oscillator 2 through a signal line connecting these circuit components, to commence oscillation. The oscillator 2 starts oscillation and produces the reference oscillation signal of 455 KHz. This reference oscillation signal is frequency-divided by the frequency-divider 5, and then to the timing generator 6. In response to that frequency-divided signal, the timing generator 6 supplies timing signals to various circuit function blocks, respectively. The respective circuit function blocks respond to the timing signals for starting their operations.

At first, the key output circuit 11 changes, to a low level, the voltage at all the key output terminals $KO_0$ to $KO_7$ to which the first signal lines a to h are respectively connected, as shown in FIG. 2. Thereafter, the key output circuit 11 sequentially feeds scan signals to the signal lines a to h through the key output terminals $KO_0$ to $KO_7$, in the order shown in FIG. 2. When this scan brings the first signal line a to a high level, the third signal line m is also brought to a high level via the diode 18.

The key input circuit 7 detects the state of the custom code selection terminal CCS connected to the third signal line m, and the detected information is registered in the custom code register $\mathbf{10}_1$. At this moment, since the first signal line a is connected to the second signal line l via the operated key switch, as described previously, the second signal line l also takes a high level. However, the timing signal from the timing generator 6 places the key input circuit 7 in the condition for detecting code data fed from the custom code preset section 15. That is the condition for inhibiting input signals from being input through the key input terminals $KI_0$ to $KI_3$ connected to the second signal lines i to l. Accordingly, in this period, the key input circuit 7 does not detect which key switch has been pushed.

The third signal line m is further connected to the first signal lines b, d and f through the diodes 19, 20 and 21. Therefore, when these first signal lines b, d and f are brought to a high voltage level by the key scan signals, the custom code selection terminal CCS is also inverted to a high level. On the other hand, the first signal lines c, e, g and h are not connected to the third signal line m. Accordingly, even though a high level is successively fed to these first signal lines c, e, g and h by the scan signals, the scan signal selection terminal CCS is kept at a low level. In this way, the high or low level information at the second signal line m produced by the scan signals is serially input to the key input circuit 7 via the scan signal selection terminal CCS as shown in FIG. 2, and it is successively registered in the custom code register $\mathbf{10}_1$.

Thus, the custom code data obtained through the custom code selection terminals CCS, in response to the first scan, becomes "11010100", and these data are registered in the custom code register $\mathbf{10}_1$. Therefore, the custom code register $\mathbf{10}_1$ has an 8-bit construction. Assuming that this custom code is a custom code individually alloted to, for example, a television receiver, custom codes for $2^8$, that is, 256 kinds of instruments can be selected and designated depending upon the number and insertion positions of diodes such as the diodes 18 to 21. In other words, custom codes individually alloted to 256 instruments can be produced by varying the number and insertion positions of the diodes.

After the data preset in the custom code preset section 15 have been registered in the custom code register $\mathbf{10}_1$ by the first scan, the key output circuit 11 again generates scan signals for an additional scan as shown in FIG. 2. This scan is effected for detecting which key switch in the keyboard switch section 14 has been pushed. More particularly, when the first signal line a is brought to a high level by the scan signal, the second signal line l is also raised to a high level through the pushed key switch, as described previously. The key input circuit 7 and the key output circuit 11 are activated by timing signals fed from the timing generator 6. In addition, the data code at the second signal lines i to l becomes "0001" when the first signal line a is at a high level. Therefore, it is recognized that the key switch connected between the first signal line a and the second signal line l has been pushed.

The key output circuit 11 includes a 3-bit counter for defining the eight key output terminals $KO_0$ to $KO_1$, while the key input circuit 7 includes a 2-bit counter for defining the four key input terminals $KI_0$ to $KI_3$. Accordingly, by making use of the combination of these counters, $2^5$, i.e. 32 key switches, can be defined and the respective key data codes can be produced. In response to change of the state of the key input terminals $KI_0$ to $KI_3$, the data of the 2-bit counter and 3-bit counter included in the key input circuit 7 and key output circuit 11, respectively, are registered in the key data register $10_2$. Therefore, the key data register $10_2$ has a 5-bit construction. In this way, the key code data corresponding to the pushed key switch can be registered in the key data register $10_2$.

More particularly, since a high level signal is input to the key input terminal $KI_3$ at the timing when the key output terminal $KO_0$ is at a high level, the data in the 3-bit counter of the key output circuit 11 is "000". On the other hand, the data in the 2-bit counter of the key input circuit 7 is "11". As a result, the data fed from the key output circuit 11 is registered in the upper 3-bit positions of the key data register $10_2$ and the data fed from the key input circuit 7 is registered in the lower 2-bit positions. Accordingly, the key data code of the pushed key is "00011", and that data code is registered in the key data register $10_2$.

Now let us assume that the pushed key switch is that connected, for instance, between the first signal line f and the second signal line i. As described previously, when the key is pushed, the oscillator circuit 2 starts oscillation, and then the custom code is read by the first scan signals. Subsequently, in response to the second scan signals, the key input terminal $KI_0$ is raised to a high level at the timing when the key output terminal $KO_5$ is brought to a high level. Accordingly, at that moment the 3-bit counter holds "101", while the 2-bit counter holds "00". Consequently, the pushed key is registered in the key data register $10_2$ in the form of the code "10100".

As will be apparent from the above description of the operation, the custom code of the instrument to be remote-controlled and the key data code of the pushed key switch are read out by the two cycles of scan signals. They are registered in the custom code register $10_1$ and the key data register $10_2$ within the data register 10, respectively. Therefore, remote control of the instrument designated by the custom code can be accomplished by transmitting these data by infrared rays. Here, it is noted that, with only one read operation, there is a possibility that incorrect data may be registered in the data register 10 due to a chattering noise caused by the push of a key switch. Moreover, if two or more key switches are simultaneously pushed, there would be malfunctions of the instrument which are to be controlled. In order to prevent such faulty operations, in the illustrated embodiment of the present invention, the read operation is effected repeatedly, and the already registered data are confirmed.

More particularly, after having transmitted 2 cycles of the scan, the key output circuit 11 feeds further 2 cycles of the scan, as shown in FIG. 2. By means of the third scan signals, the custom code is again read out, and the custom code data are registered in the custom code register $10_1$. By means of the fourth scan signals, the pushed key switches within the keyboard switch section 14 are detected in the above-described manner. However, the second detected code of the pushed key switch is not registered in the key data register $10_2$, but it is compared by the comparator 12 with the data obtained previously by means of the second scan and already registered in the key data register $10_2$. As a matter of course, this comparison operation is carried out in accordance with a timing signal fed from the timing generator 6.

As a result of the comparison by the comparator 12, if the compared data are not coincident to each other, then the comparator 12 applies an non-coincidence signal to the timing generator 6. In response to the application of the non-coincidence signal, the timing generator 6 feeds a command signal for restarting the read operation to the key output circuit 11. The read operation is restarted from its beginning as shown in FIG. 2, and again the data comparison operation is carried out. If the respective compared data are now coincident to each other, then a non-coincidence signal is no longer output from the comparator 12. Accordingly, the data registered in the key data register $10_2$ are, in themselves, used as the key data code of the pushed key switch.

In the case where two or more key switches have been pushed at the same time, that state is detected by the multi-push detector 13. More particularly, if two or more key switches are pushed simultaneously, during one key code read cycle, within one scan cycle, the change to the high voltage level occurs at least twice at any one of the key input terminals $KI_0$ to $KI_3$; or, there is a simultaneous change of voltage level at any two or more of the key input terminals $KI_0$ to $KI_3$. The multi-push detector 13 detects such specific modes of the change of voltage level of the key input terminals $KI_0$ to $KI_3$, and feeds a detection signal to the timing generator 6. In response to the detection signal, the timing generator 6 restarts the read operation from its beginning, which is similar to the case where the non-coincidence signal is applied thereto from the comparator 12.

Of course, the mode of operation, when the above-described non-coincidence signal or multi-push detection signal has been produced, is not limited to the above-described examples. For example, the operation of the entire apparatus could be stopped in response to the application of the non-coincidence signal from the comparator 12 or the detection signal from the multi-push detector 13. In such a modified case, no inconvenience would occur because the above-described series of operation will be commenced when any key switch is repushed. Moreover, the custom code data obtained by the third scan may be compared with that already registered in the custom code register $10_1$.

The data in the custom code register $10_1$ and the key data register $10_2$ which have been confirmed in the above-described manner, is subjected to Pulse-Position-Modulation by means of the controller 9. Then the resulting data is fed to the output terminal OUT after the output controller 8 superposes the data on the carrier wave signal of 38 KHz, fed from the frequency divider 5. In the Pulse-Position-Modulation, a pulse-to-pulse interval is varied depending upon whether the signal is a "1" or "0" of the data code. More particularly, depending upon whether the data code is "1" or "0", the modulated output has pulse signals of a high level. However, according to the Pulse-Position-Modulation, the modulation is effected so that when the data code is "0" the period is, for example, short, while when the data code is "1" the period is long. In this preferred embodiment employing the Pulse-Position-Modulation, when the data code is "0", the period is equal to T, while when the data code is "1", the period is equal to 2T.

The controller 9 modulates the data from the custom code register $10_1$, at first according to the Pulse-Position-Modulation. More particularly, the controller 9 serially reads data registered in the successive bits of the custom code register $10_1$. Since the data of the custom code register $10_1$ are "11010100", the controller 9 takes in the top bit "1", and after a lapse of time 2T it takes in the next bit signal. Since the next bit is also "1", after a further lapse of time 2T, it takes in the next succeeding bit signal. Since the next succeeding bit is "0", after a lapse of time T, it takes in the next succeeding bit signal. After the Pulse-Position-Modulation of the custom code data has been completed in this way, the controller 9 takes in the key code data in the key data register $10_2$ to modulate them in a similar manner.

The bit-to-bit signals produced by the controller 9 are in themselved fed serially to the output controller 8. The output controller 8 superposes the carrier signal of 38 KHz fed from the frequency divider 5 on the high level part of respective bit signals fed from the controller 9, and then supplies the superposed signal to the output terminal OUT. The signal passed through the output terminal OUT is supplied to the transmission output circuit 16. The transmission output circuit 16 drives an infrared ray emitting diode 17 in accordance with the supplied signal. Consequently, the custom code data and the key code data are transmitted in this order to the instrument to be controlled by the infrared rays.

The instrument to be controlled first detects whether the instrument is designated or not on the basis of the data input in the form of the infrared rays. When the custom code inherent in the instrument is coincident with that transmitted, the receiving section of the instrument is activated, and then it decodes the information selected by the pushed key switch.

In the transmitter having the above-described construction, the custom code is produced by making use of scan signals which are originally used for detecting the conditions of key switches. A plurality of custom codes individually allotted to different instruments can be arbitrarily preset by providing only one terminal to be used as a custom code selection terminal and by varying the number and/or insert positions of diodes 18 to 21. Therefore, by utilizing the above-described transmitter, individual remote control signal transmitters can be produced for every instrument, by a use of IC's having the same circuit construction.

Still further, a modification can be made such that individual remote control of a desired number of instruments can be achieved by making use of only one transmitter, according to the present invention. More particularly, the third signal line m may be selectively connected through external switches to any one of the first signal lines a to h. Then, by turning these external switches ON or OFF, depending upon the custom codes of the desired instruments to be controlled such as TV-receivers, VTR's, etc., the custom codes individually alloted to a plurality of instruments can be preset in the transmitter. Therefore, a plurality of instruments can be remotely-controlled by means of a single transmitter. Thus, individual remote control transmitters for a plurality of any desired number of instruments can be produced by making use of one IC. Furthermore, a remote control of a plurality of instruments can be individually achieved with a single transmitter.

It is to be noted that, as a matter of course, the present invention should not be limited to only the above-described embodiments. That is, the numbers of the respective signal lines could be arbitrarily increased or decreased depending upon the control capacity of the transmitter. The number of diodes could be also changed depending upon the numbers of the respective signal lines.

Although the ceramic resonator 3 was used to produce a reference oscillation signal, a crystal resonator or an RC-circuitry may be used in place of the ceramic resonator 3. In addition, read and confirmation operations of the key code data were carried out during four cycles of scan signals for the purpose of eliminating malfunctions caused by an external noise or a key noise in the above-described embodiment, but the confirmation operations could be omitted. Furthermore, the sequence of the detection of the custom code and the pushed key switch could be reversed, or they could be detected at the same time. Still further, there is not any need for using the pulse position modulation as a transmission output system.

In other words, the essence of the present invention resides in a use of a custom code which can be preset with a smaller number of external terminals on the IC for remote control. Therefore, the mode of data transmission, as well as the internal construction of the apparatus, can be arbitrarily modified. In addition, the smaller number of external terminals is not limited to unity. For instance, if two custom code selection terminals are provided and if similar constructions are associated with these two terminals, then in the case of the illustrated embodiment, transmitters for $256\times2=512$ kinds of instruments can be respectively constructed. In addition, while the preferred embodiment was described in connection with the example in which infrared rays are employed as transmission means, the present invention is not limited to the use of infrared rays, but is applicable to other cases where visible ray, ultraviolet ray, electric wave, supersonic wave, etc. are employed as a transmission means.

What is claimed is:

1. A transmitter comprising generating means for generating cyclically recurring scan signals, scan signal output terminals through which said respective scan signals are output, a key matrix circuit means having a plurality of column lines and a plurality of row lines connected to said respective scan signal output terminals, key input terminals connected to said respective column lines, a custom code selection terminal, custom code designation means for selectively connecting said scan signal output terminals to said custom code selection terminal in accordance with a custom code corresponding to an identity of an instrument to be controlled, and output means for outputting a custom code derived from said custom code selection terminal and key data derived from said key matrix circuit.

2. A transmitter as claimed in claim 1, in which said custom code designation means comprises at least one diode which selectively connects said scan signal output terminals to said custom code selection terminal.

3. A transmitter for generating a signal for controlling an operation of an instrument in response to at least one pushed key switch, said transmitter including means comprising at least one output terminal for outputting cyclically recurring scan signals for detecting the condition of said key switch, at least one input terminal for receiving a detection signal indicating the key switch condition, custom code means including one custom code terminal for deriving a custom code alloted to identify said instrument to be controlled, and at least one unidirectional element for connecting said output terminal to said custom code terminal.

4. A transmitter comprising a keyboard section means having a plurality of key switches and row and column lines, a signal output circuit means for outputting scan signals to respective row lines of said keyboard section, a signal input circuit means supplied with signals from column lines of said keyboard section means, a custom code selection line means electrically connected to at least one of said row lines, a first counter circuit means in said signal output circuit means for generating said scan signals, a second counter circuit means in said signal input circuit means for encoding said signals from said column lines, a first register means for registering information obtained through said custom code selection line means, a second register means for registering data in said first and second counter circuit means, and output means for outputting data of said first and second register means.

5. A transmitter as claimed in claim 4, in which said output means outputs said data of said first and second register means after converting them into infrared ray signals.

* * * * *